(12) United States Patent
Peters

(10) Patent No.: US 7,160,167 B2
(45) Date of Patent: Jan. 9, 2007

(54) ANIMAL SAFETY APPARATUS

(76) Inventor: Lynne R. Peters, 3006 Heatherpark Dr., Kingwood, TX (US) 77345-2436

( * ) Notice: Subject to any disclaimer, the term of this patent is extended or adjusted under 35 U.S.C. 154(b) by 0 days.

(21) Appl. No.: 10/859,684

(22) Filed: Jun. 3, 2004

(65) Prior Publication Data

US 2005/0272327 A1    Dec. 8, 2005

(51) Int. Cl.
B63C 9/13    (2006.01)
(52) U.S. Cl. .................. 441/88; 441/123; 119/855; 119/856
(58) Field of Classification Search .............. 441/88, 441/106–123, 80; 119/815, 850, 855, 856; 2/468; 602/18
See application file for complete search history.

(56) References Cited

U.S. PATENT DOCUMENTS

| | | | | |
|---|---|---|---|---|
| 790,682 | A * | 5/1905 | Friedman | ............ 441/113 |
| 2,791,202 | A | 5/1957 | Doyle | |
| 3,121,889 | A * | 2/1964 | Gentile | ................ 441/6 |
| 3,814,061 | A | 6/1974 | Aries et al. | |
| 4,180,016 | A | 12/1979 | George | |
| 4,218,991 | A | 8/1980 | Cole | |
| 4,266,511 | A | 5/1981 | Muench | |
| 4,360,351 | A * | 11/1982 | Travinski | ................ 441/94 |
| 4,489,677 | A | 12/1984 | Handley | |
| 4,537,154 | A | 8/1985 | Kay | |
| 4,559,906 | A | 12/1985 | Smith | |
| 4,622,018 | A | 11/1986 | Blanc | |
| 4,831,967 | A | 5/1989 | Anderson | |
| 4,936,804 | A | 6/1990 | Dowdeswell | |
| 4,973,277 | A * | 11/1990 | Khanamirian | ........... 441/88 |
| 5,022,879 | A * | 6/1991 | DiForte | ................ 441/113 |
| 5,044,321 | A | 9/1991 | Selph | |
| 5,109,803 | A | 5/1992 | Dunham et al. | |
| 5,149,271 | A | 9/1992 | Marvich | |
| 5,382,184 | A * | 1/1995 | DiForte, Jr. | ............ 441/108 |
| 5,393,254 | A * | 2/1995 | Ducheshe | ............. 441/118 |
| 5,421,760 | A | 6/1995 | Blaga | |
| 5,456,623 | A * | 10/1995 | Norris | ................ 441/92 |
| 5,632,235 | A * | 5/1997 | Larsen et al. | ............ 119/856 |
| 5,702,279 | A * | 12/1997 | Brown | ................ 441/108 |
| 6,016,772 | A | 1/2000 | Noyes | |
| 6,036,562 | A * | 3/2000 | Brown | ................ 441/108 |
| 6,070,556 | A | 6/2000 | Edwards | |
| 6,106,348 | A * | 8/2000 | Loisel | ................ 441/108 |
| 6,234,857 | B1 | 5/2001 | Suellentrop | |
| D445,223 | S | 7/2001 | Butler | |

(Continued)

FOREIGN PATENT DOCUMENTS

DE    29923028 U1 *    2/2000

(Continued)

OTHER PUBLICATIONS

PETCO.com—Product Details, "Fido Float", 2 pages, product SKU # 734454, available at http://www.petco.com/product_info.asp?sku=1035810228&dept_id=%2D2, Aug. 4, 2004.

(Continued)

Primary Examiner—Ajay Vasudeva
(74) Attorney, Agent, or Firm—Jeffrey L. Wendt

(57) ABSTRACT

Apparatus useful for providing buoyancy for animals are described. One apparatus includes a strap-like carrier and one or more non-inflatable floatation members secured substantially adjacent the carrier by a cover material stitched to the carrier. Another apparatus includes hook and loop fasteners to both fasten the ends of the carrier together as well as fasten the non-inflatable floatation members to the carrier.

15 Claims, 3 Drawing Sheets

U.S. PATENT DOCUMENTS

| | | | |
|---|---|---|---|
| 6,314,915 B1 | 11/2001 | Pope et al. | |
| D453,594 S | 2/2002 | Ishihara | |
| 6,357,639 B1 * | 3/2002 | Williams | 224/222 |
| 6,394,866 B1 * | 5/2002 | Brown | 441/108 |
| 6,422,177 B1 | 7/2002 | Noguero | |
| 6,454,735 B1 | 9/2002 | Hamada | |
| 6,571,745 B1 | 6/2003 | Kerrigan | |
| 6,595,162 B1 | 7/2003 | Hibbert | |
| 6,659,046 B1 | 12/2003 | Schmid et al. | |
| 6,659,824 B1 | 12/2003 | McCormick | |
| 6,679,198 B1 | 1/2004 | LaGarde | |
| 2003/0037735 A1 | 2/2003 | Albers et al. | |

FOREIGN PATENT DOCUMENTS

| | | |
|---|---|---|
| FR | 2573382 A1 * | 5/1986 |
| FR | 2792282 A1 * | 10/2000 |
| GB | 1452544 A * | 10/1976 |
| GB | 2194131 A * | 3/1988 |
| WO | WO 9304915 A1 * | 3/1993 |

OTHER PUBLICATIONS

PETCO.com—Product Details, "Fido Float", 2 pages, product SKU # 734489, available at http://www.petco.com/product_info.asp?sku=1035810228&dept_id=%2D2,Aug. 4, 2004.

PETsMART.com—Comfort Harness from Super Pet, 1 page, available at http://www.petsmart.com/global/product_detail.jsp?PRODUCT%3C%3Eprd_id=845524441779176&ASS, Aug. 4, 2004.

PETsMART.com—Safety Turtle Water Safety Alarm, 1 page, available at http://www.petsmart.com/global/product_detail.jsp?PRODUCT%3C%3Eprd_id=845524441806314&ASS, Aug. 2004.

* cited by examiner

ANIMAL SAFETY APPARATUS

BACKGROUND OF THE INVENTION

1. Field of the Invention

The invention is generally related to the field of animal safety. More specifically, the invention relates to apparatus for reducing or eliminating the possibility of an animal drowning, particularly domestic animals.

2. Related Art

Pets and other domestic animals have attained special place in many human lives as friends, a source of protection and guidance, a means of relieving stress through play or journeys to the park, and in some cases a means of making a living. When near water bodies, especially those having steep walls or cliffs, such as oceans, lakes, ponds, swimming pools meant for human use, spas, and even bath tubs, animals are in a predicament in that they have the possibility of drowning. This is a severe problem for domestic pets, such as small dogs and cats. In today's world, where space comes at a premium, and costs for caring for large pets can be onerous, humans desiring canine and feline companions, or other animals are finding justification for smaller animals. While this gravitation toward smaller animals alleviates somewhat the space and expense issues, smaller animals have a disadvantage in that they frequently have difficulty extricating themselves from situations, such as bodies of water. Unless the pool or other water body has readily available means for egress, such as steps or a gradual slope, such as found at a beach, the animal may drown since it cannot continue swimming indefinitely. Even in situations where a means for egress is present there have been incidents where the animal simply is not able to find the steps, or has not been trained to do so.

There are of course many known devices in the patent literature for domestic animals, however, these typically fall in categories such as pest killing and drug delivery; protective apparel such as udder protectors for cows, clothing and bandages; training devices, such as imitation cattle horns; and animal control devices, such as tag and release devices, pet cages, and pet restraint harnesses.

In the area of collars and bands there may be found, for example, U.S. Pat. No. 5,109,803, which discloses a padded sleeve for a pet collar. U.S. Pat. No. 6,422,177 discloses a decorative pet flea collar and method for changing the appearance of the flea collar. U.S. Pat. No. 4,266,511 discloses an ornamental and protective collar. U.S. Pat. No. 4,218,991 discloses a pet collar with a retainer thereon for reception of a removable, flexible strip. U.S. Pat. No. 4,180,016 discloses a safety pet collar that frictionally releases, so that the pet does not choke when the collar becomes entangled on a foreign object. This device would apparently not be useful for ensuring the animal does not drown. Some patents describe collars that include absorbent materials for delivery of medicaments, such as U.S. Pat. No. 2,791,202. A recently published patent application, U.S. Pat. Pub. No. 20030037735A1, describes an animal collar system for safely and conveniently limiting physical movement of an animal's head, for example after the animal has had surgery. The animal collar system includes an elongate protective member having a generally broad cylindrical structure and is preferably comprised of a resilient material such as foam material, which may be buoyant.

As may be seen, the need remains for apparatus to efficiently and safely prevent accidental drowning of domestic animals, particularly near bodies of water that have steep and/or slippery side surfaces.

SUMMARY OF THE INVENTION

In accordance with the present invention, apparatus are presented which reduce or overcome the problem of animal drowning.

A first embodiment of the pet animal safety apparatus comprises:
  a) a carrier adapted to fit around a pet's neck, the carrier having front and back surfaces;
  b) at least one non-inflatable floatation member positioned substantially adjacent at least one of the front and back surfaces; and
  c) a cover material positioned over the at least one floatation member, the cover material fastened to the carrier in such a way to secure the at least one floatation member substantially adjacent the carrier.

Preferred apparatus of this embodiment the invention are those wherein the carrier is an elongate strap comprising first and second ends adapted to be fastened together using a fastening means; those apparatus wherein the fastening means is selected from the group consisting of hook and loop fasteners, buckles, clasps, snaps, pins, and buttons; and those wherein the carrier comprises a carrier material selected from the group consisting of natural and synthetic carrier materials. The carrier material may be a natural material, including, but not limited to, leather, or synthetic material selected from the group consisting of woven and nonwoven materials. Suitable woven synthetic materials include those comprising fibers selected from the group consisting of nylon, polyester, cotton, and combinations thereof. The at least one floatation member may be a single floatation member or a plurality of floatation members. The at least one floatation member may be a synthetic foam material, preferably a closed cell foam, wherein the synthetic foam material is selected from the group consisting of foamed polystyrene, foamed polyurethane, and foamed polyethylene. The cover material may be a synthetic material, such as woven nylon fabric, and the cover material is preferably stitched to the carrier, holding the floatation member(s) adjacent the carrier. When a plurality of floatation members are employed in this embodiment, the cover material may be stitched to the carrier in locations sufficient to keep the floatation members substantially adjacent to the carrier.

A second embodiment of the invention is a pet animal safety apparatus comprising a strap-like carrier adapted to fit around a pet's neck, the carrier having front and back surfaces, first and second ends, and means to fasten the ends together; and at least one non-inflatable floatation member removably fastened to at least one of the front and back surfaces of the carrier. Preferred apparatus within this embodiment are those wherein the strap-like carrier includes a first portion of a fastener and the at least one floatation member includes a mating second portion of the fastener, such as a snap fastener or hook and loop type fastener. Apparatus of this embodiment are useful when the animal owner wishes to quickly change the appearance and/or adjust the floatation characteristics of the device, for example to use with more than one animal.

Further aspects and advantages of the invention will become apparent by reviewing the description of preferred embodiments that follows.

DESCRIPTION OF PREFERRED EMBODIMENTS

The phrase "substantially adjacent", as that term is used herein when referring to the positional relationship between the floatation members and the carrier, means that normally the floatation member or members are adjacent to and touching at least one surface of the carrier, but some "looseness" is allowed, so that the floatation members may move away from the carrier slightly, for example if the cover material stretches.

The present invention relates generally to apparatus for animal safety, and more specifically to apparatus for reducing or eliminating the possibility of an animal drowning, particularly domestic animals such as house pets. A particular use for apparatus of the invention is for small pet mammals, for example those weighing less than about 50 pounds. Although apparatus of the invention in the form of collars may be made to easily break away from the animal if the apparatus becomes entangled in some object, such as fence, it is preferred that apparatus of the invention be only used for short time periods, and be reasonably difficult to be removed by such "snagging" events.

Figure 1A:
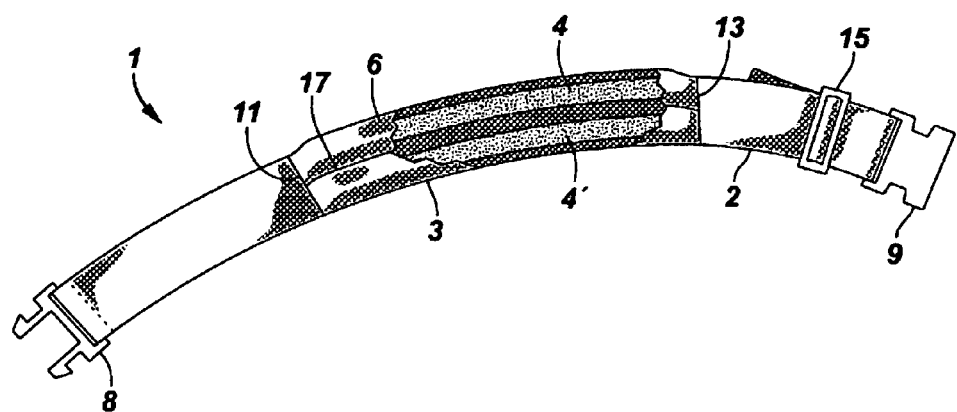
FIGS. 1A and 1B are perspective views of two apparatus of the invention.

Referring to FIG. 1A, there is illustrated schematically, with parts broken away, a perspective view of one apparatus 1 in accordance with the invention. This apparatus comprises a carrier 2, generally having a shape of a belt or strap of material, two floatation members 4 and 4', illustrated as tube-shaped, but which may take any number of regular or irregular shapes, and a cover material 6, permanently fastened to carrier 2 at locations 3, 11, 13, and 17. These may be stitched, glued, thermally bonded, or some combination of these fastening means. Cover material can be a single piece or multiple pieces. This apparatus includes a male portion of a fastener 8 and a female portion 9, forming together a plastic buckle that is commonly known, as well as an optional length adjustment means 15.

Figure 1B:
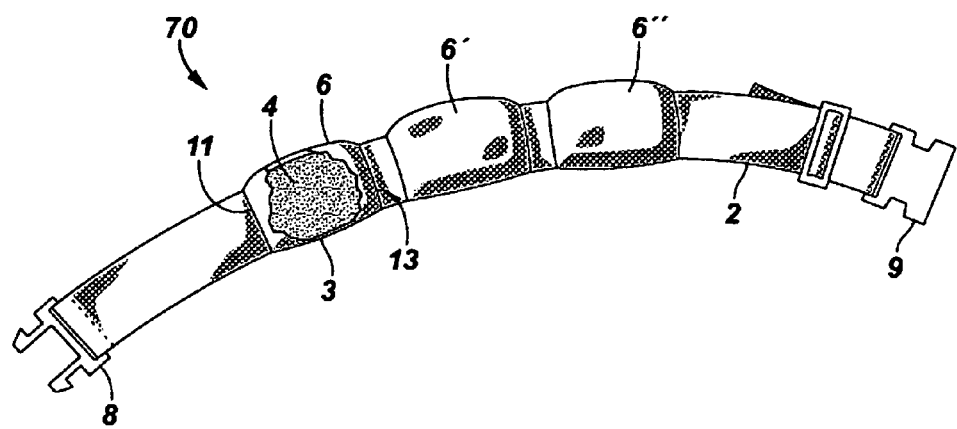

FIG. 1B illustrates schematically another embodiment 70, again with parts broken away, similar to embodiment 1 of FIG. 1A, but differing in architecture by employing three floatation members 4, 4', and 4" (floatation member 4 being the only one illustrated). Cover materials 6, 6', and 6", which may be the same or different in composition, color, and the like, are illustrated, with cover material 6 covering floatation member 4, cover material 6' covering floatation member 4', and so on. More or less than three floatation member/cover material combinations may be used. Cover materials 6, 6', and 6" are permanently fastened, preferably stitched to carrier 2 at locations 3, 11 and 13 as in FIG. 1A.

Figure 2:
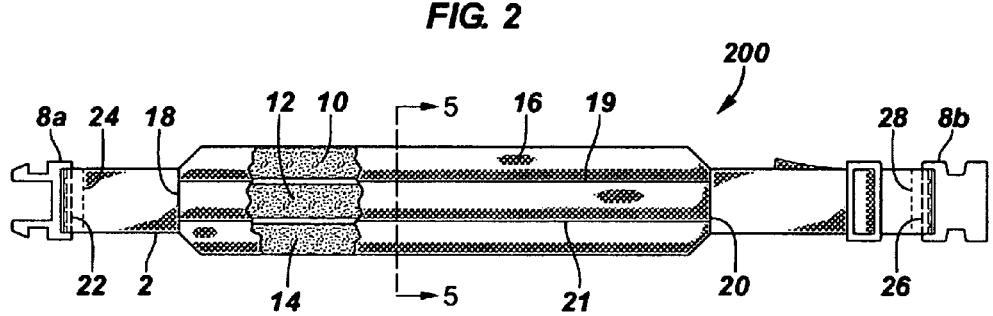
FIGS. 2, 3, and 4 are plan views of three apparatus of the invention.
Figure 5:
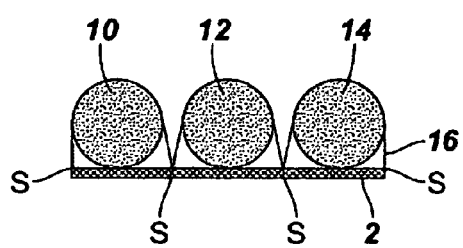
FIGS. 5, 6, and 7 illustrate sectional views of the apparatus of FIGS. 2, 3, and 4, respectively.

FIG. 2 illustrates in plan view, with parts broken away, of another embodiment 200 of the invention, which includes a carrier 2 and three tubular floatation members 10, 12, and 14. In this embodiment the three floatation members are identical, but this is not necessary to the inventive apparatus. A cover material 16 is fastened to carrier 2 at locations 18, 19, 20, and 21, preferably stitched. A male portion 8a of a plastic buckle is illustrated, as well as a female portion 8b. Each buckle portion is fastened to carrier 2 by sewn loops of carrier material, these stitching illustrated at 24 and 28. Male portion 8a has a piece 22, illustrated with dotted lines, which fits inside a loop of the carrier material, while female portion 8b has a similar portion 26, also illustrated with dotted lines. FIG. 5 is a cross-section elevation view taken along line 5—5 in FIG. 2, illustrating the position of stitches, denoted "S", and illustrating how floatation members 10, 12, and 14 are held substantially adjacent carrier 2.

Figure 3:
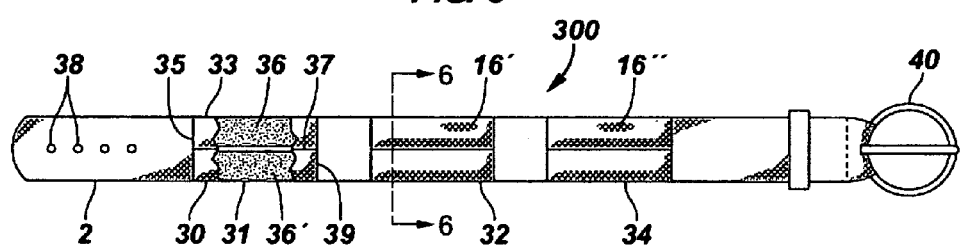
Figure 6:
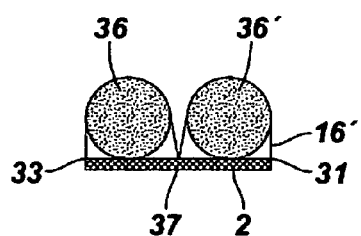

FIG. 3 illustrates in plan view, with parts broken away, of another embodiment 300 of the invention. This embodiment resembles a common canine collar, wherein the carrier 2 may be a leather strap, for example. A series of holes 38 are provided, one of which interlocks in known fashion with buckle 40 in accordance with the desired tightness of fit of the collar. In this embodiment, a series of three floatation locations are provided, numbered 30, 32, and 34, each location having a cover material and floatation member or members. A cover material 16 is illustrated with parts broken away, while two other cover materials 16' and 16" are illustrated in whole. Floatation members 36 and 36' are illustrated, held substantially adjacent carrier 2 by the combined action of cover material 16 and stitching or other fastening means at end locations 35 and 39, middle location 37, and side locations 31 and 33. FIG. 6 is a cross-section elevation view taken along line 6—6 in FIG. 3, illustrating the position of stitches or other fastening means 31, 33, and 37, again illustrating how floatation members 36 and 36' are held substantially adjacent carrier 2.

Figure 4:
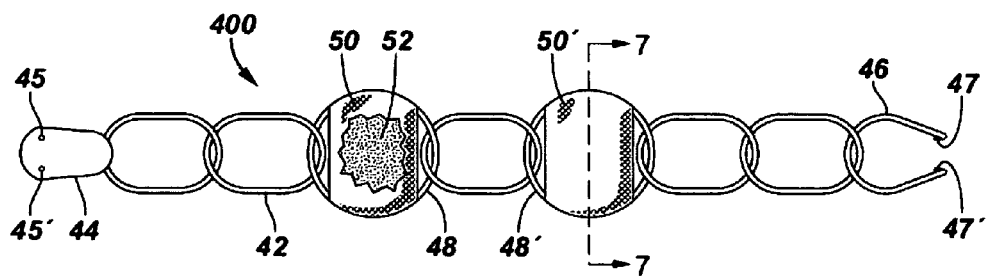
Figure 7:
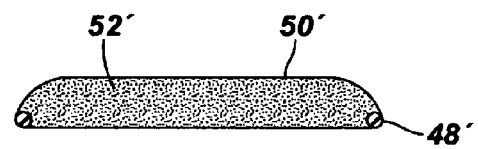

Referring now to FIGS. 4 and 7, there are illustrated plan and cross-section elevation views of another embodiment 400 of the invention. Embodiment 400 comprises a chain carrier 42 having a first fastening end 44 having two through holes 45 and 45', and a second fastening end 46 having two prongs 47 and 47' which fit into through holes 45 and 45', respectively. A cover material 50 is illustrated, with a portion broken away allowing viewing of a floatation member 52, which is held substantially adjacent carrier 42, more specifically link 48. FIG. 7 illustrates this more clearly, illustrating cover material 50', floatation member 52' and link 48'. Links 48, 48' and others illustrated may be the same or different in size, shape, and composition, and are preferably metallic, although this is not required. Cover material 50' extends on both sides of carrier 2, and maintains floatation member 52' substantially adjacent carrier 2.

Figure 8:
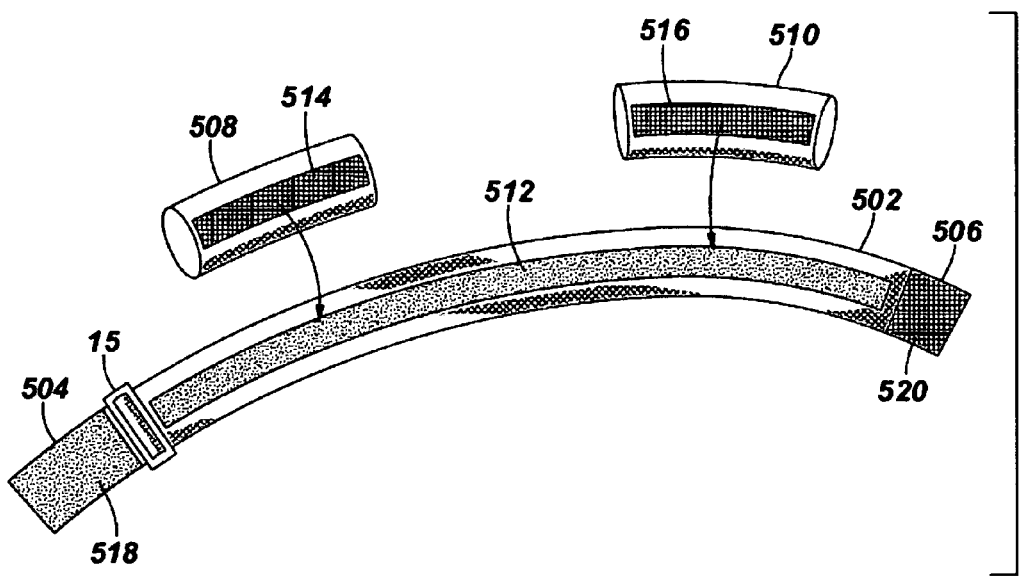
FIG. 8 is an exploded perspective view of another apparatus of the invention.

FIG. 8 illustrates an exploded perspective view of another apparatus 500 of the invention. This apparatus, and variations of it, are meant for those instances where the animal owner may wish to change the appearance of the apparatus, change the floatation characteristics (more buoyancy), or some combination of these. This embodiment is also one that is easy to put on and take off, as will be seen. Illustrated in FIG. 8 is a carrier 502 having ends 504 and 506, and two floatation members 508 and 510, and an optional length adjustment means 15. Traversing a major length of carrier 502 is a strip 512 of one side of a hook and loop fastener, which is adapted to mate with corresponding other sides 514 and 516. Strip 512 is glued, stitched, or otherwise secured to carrier 502. Alternatively, piece 512 could be two female portions of snap devices, while components 514 and 516 are male pieces of the snap devices. Preferably, ends 504 and 506 also comprise one side each of a hook and loop type fastener, 518 and 520, respectively. Alternatively, a plastic or metal buckle, snap device, and the like could be used. As may be understood, this embodiment is very flexible in use. The animal could, for example, wear only the carrier most of the time, and when the owner or caretaker wants to or must leave the vicinity of a swimming pool or other body of water, simply affix the floatation members 508 and 510 to carrier 502. Upon returning, the owner or caretaker could simply remove the floatation members. Further, while this embodiment as illustrated does not include cover materials over the floatation members, these could be added without taking away from the function of the apparatus.

Floatation members suitable for use in the invention of course require the function of buoyancy. Preferably the floatation member is made of a foamed polymeric material, such as foamed polystyrene, foamed polyurethane, foamed polyisocyanurate, foamed polyethylene, foamed rubbers, such as foamed polyvinyl chloride/acrylonitrile butadiene (PVC/NBR) rubber, and the like. Preferably the foam is a closed cell foam. Commercial products, such as the materials known under the trade designations "Ensolite®" and "OleTex®", both available from RBX Industries, Inc., Roanoke, Va., USA, may find use as floatation members. Products known under the trade designation "Ensolite®" are made in many varieties, but are all essentially variations of PVC/NBR foamed polymers having maximum water absorption of 0.1 lb/ft$^2$ when tested using American Society of Testing Materials (ASTM) test D-1667. The products under the OleTex® product line are high-performance, closed cell polyolefin foams, chemically cross-linked using a patented, continuous processing method. The materials are closed cell and moisture proof. These products can be die cut, heat sealed, vacuum formed, and heat molded.

Carrier materials may be natural, synthetic, or combination thereof. Woven polyamide fabric is one preferred synthetic carrier material, due to its strength and flexibility. Leather is a preferred natural material. The material of choice will depend on many factors, including the weight of the animal, the type and amount of floatation member, and the desires of the animal owner.

Cover materials may also be selected from natural, synthetic, or combinations thereof. Woven polyamide fabric is one preferred cover material.

Fastening means are common and require no further explanation. One preferred hook and loop fastener is that known under the trade designation Velcro®, available from Velcro USA, Manchester, N.H.

The embodiments of the invention allow an animal owner flexibility in their lifestyle, for example when it is necessary to leave the home for a short time period for a scheduled or unscheduled event, such as a doctor appointment, a trip to the grocery store for a recipe item, or similar trips. The owner, after securing the device to the animal, typically around the neck, or securing one or more floatation members to the previously secured carrier, may leave the home safe in the knowledge that the pet will not drown in a swimming pool or bath tub filled with water.

Although the foregoing description is intended to be representative of the invention, it is not intended to in any way limit the scope of the appended claims.

What is claimed is:

1. A pet animal safety flotation collar comprising:
   a) an elongate, substantially solid, flexible strap dimensioned to fit around a pet animal's neck, the strap having front and back surfaces and a length extending between first and second ends,
   b) a length adjustment means adapted to selectively and variably adjust the length of the strap;
   c) a plurality of non-inflatable floatation members positioned substantially adjacent at least one of the front and back surfaces; and
   d) a cover material positioned over the plurality of floatation members substantially intermediate the first and second ends, the cover material fastened to the strap in such a way as to secure the plurality of floatation members substantially adjacent the strap, wherein the cover material is stitched to the strap in locations between the non-inflatable floatation members, and wherein the front and back surfaces remain exposed proximate the ends.

2. The flotation collar of claim 1 wherein the strap has fastening means adapted to fasten the first end to the second end.

3. The flotation collar of claim 2 wherein the fastening means is selected from the group consisting of hook and loop fasteners, buckles, clasps, snaps, pins, and buttons.

4. The flotation collar of claim 1 wherein the strap comprises a material selected from the group consisting of natural and synthetic materials.

5. The flotation collar of claim 4 wherein the material is a natural material.

6. The flotation collar of claim 5 wherein the natural material is leather.

7. The flotation collar of claim 4 wherein the synthetic material is selected from the group consisting of woven and nonwoven materials.

8. The flotation collar of claim 7 wherein the synthetic material is woven and comprises fibers selected from the group consisting of nylon, polyester, cotton, and combinations thereof.

9. The flotation collar of claim 1 wherein the plurality of non-inflatable floatation members each comprises synthetic foam material.

10. The flotation collar of claim 9 wherein the synthetic foam material is selected from the group consisting of foamed polystyrene, foamed polyurethane, foamed polyolefin, and a foamed mixture comprising polyvinyl chloride and acrylonitrile butadiene rubber.

11. The flotation collar of claim 1 wherein the cover material is a synthetic material.

12. The flotation collar of claim 11 wherein the synthetic material is woven nylon fabric.

13. The flotation collar of claim 1 wherein the plurality of non-inflatable floatation members each has a maximum water absorption of 0.1 lb/ft$^2$.

14. A pet animal safety flotation collar comprising:
    a) an elongate, substantially solid, flexible strap dimensioned to fit around a pet animal's neck, the strap having front and back surfaces and a length extending between first and second ends, and a first hook-and-loop fastener adapted to fasten the ends together;
    b) a length adjustment means adapted to selectively and variably adjust the length of the strap; and
    c) at least one non-inflatable floatation member removably attached to one of the front and back surfaces of the strap by a second hook-and-loop fastener, the at least one non-inflatable floatation member being attached to the strap substantially intermediate the first and second ends such that the front and back surfaces remain exposed proximate the ends.

15. The flotation collar of claim 14 wherein the at least one non-inflatable floatation member has a maximum water absorption of 0.1 lb/ft$^2$.

* * * * *